United States Patent
Parris

(10) Patent No.: US 7,006,740 B1
(45) Date of Patent: Feb. 28, 2006

(54) COMMUNICATION CABLE HAVING A SOFT HOUSING

(75) Inventor: Donald R. Parris, Newton, NC (US)

(73) Assignee: Corning Cable Systems, LLC, Hickory, NC (US)

( * ) Notice: Subject to any disclaimer, the term of this patent is extended or adjusted under 35 U.S.C. 154(b) by 193 days.

(21) Appl. No.: 10/662,573

(22) Filed: Sep. 15, 2003

Related U.S. Application Data

(63) Continuation of application No. 09/966,646, filed on Sep. 28, 2001, now Pat. No. 6,748,146, and a continuation-in-part of application No. 09/322,625, filed on May 28, 1999, now Pat. No. 6,374,023.

(51) Int. Cl.
    *G02B 6/44*    (2006.01)

(52) U.S. Cl. ................................................. 385/109

(58) Field of Classification Search ................. 385/109, 385/95–98, 134–135, 101–108, 110–114
See application file for complete search history.

(56) References Cited

U.S. PATENT DOCUMENTS

| | | | |
|---|---|---|---|
| 3,607,487 A | 9/1971 | Chatham et al. | 156/47 |
| 3,711,262 A | 1/1973 | Keck et al. | 65/3 |
| 3,717,716 A | 2/1973 | Biskeborn et al. | 174/25 R |
| 3,843,568 A | 10/1974 | Woodland et al. | 260/2.5 B |
| 3,879,575 A | 4/1975 | Dobbin et al. | 174/92 |
| 3,884,550 A | 5/1975 | Maurer et al. | 350/96 |
| 4,176,240 A | 11/1979 | Sabia | 174/23 |
| 4,239,335 A | 12/1980 | Stiles | |
| 4,279,470 A | 7/1981 | Partinari et al. | 350/96.23 |
| 4,331,379 A | 5/1982 | Oestreich et al. | |
| 4,351,913 A | 9/1982 | Patel | 523/218 |
| 4,464,013 A | 8/1984 | Sabia | 350/96.23 |
| 4,497,538 A | 2/1985 | Patel | 350/96.23 |
| 4,509,821 A | 4/1985 | Stenger | 350/96.23 |
| 4,701,016 A | 10/1987 | Gartside, III et al. | 350/96.23 |
| 4,705,571 A | 11/1987 | Lange et al. | 106/287.1 |
| 4,723,831 A | 2/1988 | Johnson et al. | 350/96.23 |
| 4,730,894 A | 3/1988 | Arroyo | 350/96.23 |
| 4,763,982 A | 8/1988 | Greveling | 350/96.23 |
| 4,770,489 A | 9/1988 | Saito et al. | 350/96.23 |
| 4,776,910 A | 10/1988 | Taylor et al. | 156/145 |
| 4,798,853 A | 1/1989 | Handlin, Jr. | 523/173 |
| 4,810,395 A | 3/1989 | Levy et al. | 252/28 |
| 4,818,060 A | 4/1989 | Arroyo | 350/96.23 |
| 4,822,133 A | 4/1989 | Peacock | 350/96.23 |
| 4,826,278 A | 5/1989 | Gartside, III et al. | 350/96.23 |
| 4,844,575 A | 7/1989 | Kinard et al. | 350/96.23 |

(Continued)

FOREIGN PATENT DOCUMENTS

| | | |
|---|---|---|
| CA | 2304904 A1 | 11/2000 |
| EP | 0297409 B1 | 10/1994 |
| EP | 0518738 B1 | 8/1996 |
| EP | 0584129 B1 | 7/1997 |
| EP | 0969302 A1 | 1/2000 |
| EP | 1006385 A1 | 6/2000 |
| EP | 1024382 A2 | 8/2000 |
| EP | 1052533 A1 | 11/2000 |
| EP | 1070975 A1 | 1/2001 |
| WO | WO98/08124 | 2/1998 |

OTHER PUBLICATIONS

American Society for Testing and Materials, "Standard Test Method for Rubber Property–Durometer Hardness", 2002.
Monprene Technical Bulletin MP1845; Feb. 20, 2001.
Monprene Technical Bulletin MP 1500; Feb. 1, 2001.

*Primary Examiner*—J. F. Duverne
(74) *Attorney, Agent, or Firm*—Michael E. Carroll, Jr.

(57) ABSTRACT

A cable containing at least one optical fiber and at least one material. The at least one optical fiber being at least partially embedded within the at least one material, and the at least one material forming a housing that protects the at least one optical fiber. The at least one material having a Shore A hardness of about 75 or less.

24 Claims, 5 Drawing Sheets

U.S. PATENT DOCUMENTS

| | | | |
|---|---|---|---|
| 4,645,298 A | 2/1990 | Harbort et al. | |
| 4,898,451 A | 2/1990 | Story | 350/96.23 |
| 4,909,593 A | 3/1990 | Harbort et al. | 350/96.23 |
| 4,942,270 A | 7/1990 | Gamarra | 174/93 |
| 5,049,593 A | 9/1991 | Marciano-Agostinelli et al. | 523/173 |
| 5,149,736 A | 9/1992 | Gamarra | 524/490 |
| 5,155,789 A | 10/1992 | Le Noane et al. | 385/106 |
| 5,224,192 A | 6/1993 | Wagman | 385/112 |
| 5,262,468 A | 11/1993 | Chen | 524/476 |
| 5,268,971 A | 12/1993 | Nilsson et al. | 385/101 |
| 5,343,549 A | 8/1994 | Nave et al. | 385/103 |
| 5,345,526 A | 9/1994 | Blew | 385/112 |
| 5,435,944 A | 7/1995 | Shackleton | 264/1.28 |
| 5,487,126 A * | 1/1996 | Oestreich et al. | 385/105 |
| 5,657,410 A | 8/1997 | Fehn et al. | 385/102 |
| 5,671,312 A | 9/1997 | Jamet | 385/100 |
| 5,698,615 A | 12/1997 | Polle | 523/173 |
| 5,703,984 A | 12/1997 | Carratt et al. | 385/106 |
| 5,737,469 A | 4/1998 | Castello et al. | 385/109 |
| 5,751,880 A | 5/1998 | Gaillard | 385/109 |
| 5,793,921 A * | 8/1998 | Wilkins et al. | 385/135 |
| 5,825,961 A * | 10/1998 | Wilkins et al. | 385/135 |
| 5,905,834 A | 5/1999 | Anderson et al. | 385/111 |
| 5,911,023 A | 6/1999 | Risch et al. | 385/100 |
| 5,994,450 A | 11/1999 | Pearce | 524/505 |
| 6,041,153 A | 3/2000 | Yang | 385/109 |
| 6,178,278 B1 | 1/2001 | Keller et al. | 385/109 |
| 6,215,931 B1 | 4/2001 | Risch et al. | 385/109 |
| 6,253,012 B1 | 6/2001 | Keller et al. | 385/109 |
| 6,382,845 B1 * | 5/2002 | Gould et al. | 385/95 |

* cited by examiner

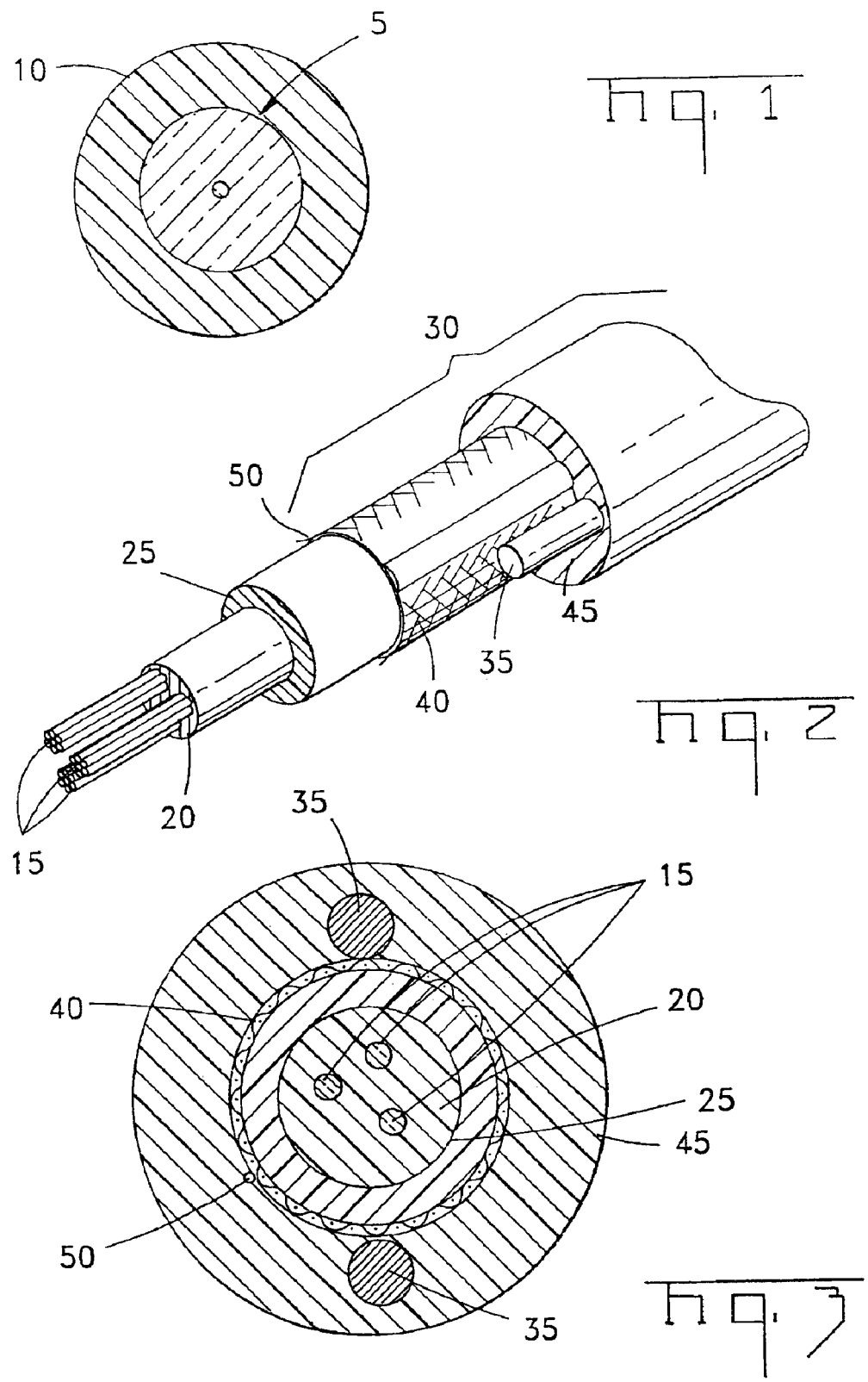

COMMUNICATION CABLE HAVING A SOFT HOUSING

The present application is a Continuation-in-Part of U.S. Ser. No. 09/322,625 filed May 28, 1999, now U.S. Pat. No. 6,374,023, which is incorporated herein by reference. This application is a continuation of U.S. Ser. No. 09/966,646 filed Sep. 28, 2001, now U.S. Pat. No. 6,748,146.

The present invention relates to communication cables having at least one light waveguide at least partially contacting and/or partially embedded within a soft housing.

BACKGROUND OF THE INVENTION

1. Field of the Invention
2. Background of the Disclosure

Three general types of protective coatings have been recognized in the optical cable art: 1) loose tube buffers, 2) tight buffers and 3) composite buffers. See Mahlke, G. and Gossing, P., *Fiber Optic Cables*, John Wiley and Sons Limited, N.Y., 1987, pp. 96–108. Other specialized constructions have also been developed. See, for example, Saito et al., U.S. Pat. No. 4,770,489, which discusses the use of a grooved spacer core to carry a group of fibers, wherein the grooves are filled with a soft jelly-like material, the spacer is surrounded with a layer of aramid fiber, and the aramid fiber is surrounded by a plastic jacket. Filling compounds and flooding compounds are used within cables to block the flow of water therein but they are not wholly interchangeable. Filling compounds are suitable for contact with fibers and must not include a base composition or additives that result in unacceptable levels of optical performance changes.

Flooding compounds, on the other hand, typically include ingredients that render them unsuitable for contact with optical fibers. Generally filling compounds will be located in a tube having at least one optical fiber, and flooding compounds will be located exteriorly of the tube.

In the loose tube construction, one or more fibers are surrounded by a protective tube, typically referred to as a core or buffer tube, which is spaced from the fiber(s) by a distance sufficient to allow the fiber(s) to move within the core or buffer tube in response to applied stresses. By placing the fiber loosely in a tube, the fiber is substantially decoupled from the rest of the cable. Typically, the space between the fiber(s) and the loose tube is filled with a filling material, e.g., a grease or a thixotropic gel, so as to inhibit or prevent water migration in the tube and/or to protect the fiber(s) from water absorption.

Greveling, U.S. Pat. No. 4,763,982, discloses a cable comprising: 1) an outer jacket and 2) an inner tube composed of strength members, such as aramid fibers, embedded in resin carrier, the inner tube being filled with a thixotropic water blocking medium. Peacock, U.S. Pat. No. 4,822,133, discloses the use of water blocking grease used as a filling material in a tube. Other filling materials have included petroleum jelly mixed with a polymer, usually polyethylene, as described by Biskeborn et al, U.S. Pat. Nos. 3,607,487 and 3,717,716. Other filling materials have included a low viscosity oil thickened by a styrene-isoprene-styrene copolymer, again with polyethylene added to impart consistency and reduce slump; see, for example, Dobbin et al., U.S. Pat. No. 3,879,575.

Sabia, U.S. Pat. No. 4,464,013, describes the use of a mixture of (1) from 85 to 94 percent by weight of ASTM Type 103, 104A, or 104B, or mixtures thereof, naphthenic or paraffinic oil having a minimum specific gravity of 0.855; a minimum SUS viscosity at 210° F. of 40; a maximum pour point ASTMD 97 of less than −5° F.; and a maximum of 5 percent aromatic oils; and (2) from 6 to 15 percent by weight of a styrene-ethylene butylene-styrene block copolymer having a styrene-rubber ratio of from approximately 0.2 to 0.5. These two ingredients comprise substantially 100 percent of the filling material, but with up to 1 weight percent of the filling material being stabilizer.

Patel, U.S. Pat. No. 4,497,538, proposes the use of a mixture of a block copolymer, petroleum and an additive. The block copolymer is a styrene-ethylene butylene-styrene (SEBS) having a styrene to rubber ratio of 0.39 to 0.41, and a specific gravity of approximately 0.91. The petroleum is a mixture of microcrystalline waxes and oil that contains a small amount of an antioxidant additive. The additive is a low molecular weight polyethylene having a molecular weight range from 1,000 to 10,000 and a specific gravity of at least 0.90.

A major component of the foregoing filling compositions is a petroleum based filling composition, for example, an oil, grease, or wax that has been mixed with minor amounts of one or more organic and/or inorganic compounds. Such petroleum based filling compositions are relatively expensive, require special blending and are not suitable for use with all cable components. For example, not all plastics commonly used for cable components are adequately resistant to the petroleum-based composition.

Another disadvantage of petroleum based filling compositions is that they may not be suitable in all environments. For example, a petroleum based composition may not form a network of molecular bonds that sufficiently reduces flow under normal cable use environments. As a result, petroleum based compositions are often messy, particularly for those working with the cable in the field. Moreover, known filling compositions are susceptible to dripping at high temperatures, and may cause undesirably high optical performance losses at lower operating temperatures.

SUMMARY OF THE PREFERRED EMBODIMENTS OF THE DISCLOSURE

It is an object of the invention to provide an alternative to the petroleum based filling materials conventionally used in the art by at least partially embedding an optical waveguide in a relatively soft material(s). In one embodiment of the present invention the material(s) comprises a three-dimensional molecular network that have bonded through crystallization, intermolecular hydrogen bonding and/or intermolecular polar attraction of functional groups and not necessarily through covalent crosslinking. The three dimensional network, optionally including various additives, desirably possesses suitable properties under service conditions such that temperature change does not cause undesirable strain on the fibers, desirably possesses a low modulus thereby minimizing the resulting strain on the optical fiber, inhibits dripping at high temperatures and is inexpensive.

It is a further object of the invention to provide an alternative to the petroleum based filling materials, which possesses other desirable characteristics. For example, the material(s) desirably does not slump excessively at elevated service temperatures, so that the material(s) will not migrate out of the end of the tube. Further, the material(s) is desirably not excessively oily or greasy, is not messy, and desirably has a soft rubber-like texture allowing for convenient handling during cable repair, fiber access, and other operations.

It is a further object of the invention to provide an alternative to the petroleum based filling materials incorporated in a tube. The material(s) desirably possesses a melt flow at temperatures over about 80° C., preferably between about 90° C. and about 125° C., yet remains sufficiently soft at temperatures as low as about −50° C. so as not to cause undesirable optical attenuation. By use of the material(s), slicing of the tube may be employed for optical fiber access without the ordinary dripping considerations.

It is a further object of the invention to provide material(s) with a three-dimensional network that may include controlled amounts of any or substantial amounts of petroleum based oils, greases and waxes, and can exclude additives often employed with the oils, greases and waxes. Additives that may be excluded from the material(s) of the invention include fumed silica and other silica products. However, superabsorbent materials such as hydrophilic polymers and other stabilizers often used with conventional petroleum based filling materials may be desirable for use with the present invention.

It is a further object of the invention to provide a three dimensional network of material(s) including a foam incorporated therein. For example, the foam may be created by injecting gas into the material(s), adding materials to the which split off a gas when heated, dissolving a gas in the material(s) under pressure, adding microspheres, as well as other mechanical and chemical means.

BRIEF DESCRIPTION OF THE DRAWINGS

FIG. 1 is a cross-sectional view of an optical fiber according to one embodiment of the invention;

FIG. 2 is a perspective view of a communication cable according to one embodiment of the invention;

FIG. 3 is a cross-sectional view of a communication cable according to FIG. 2;

DETAILED DESCRIPTION OF THE PREFERRED EMBODIMENTS OF THE DISCLOSURE

Figure 4:
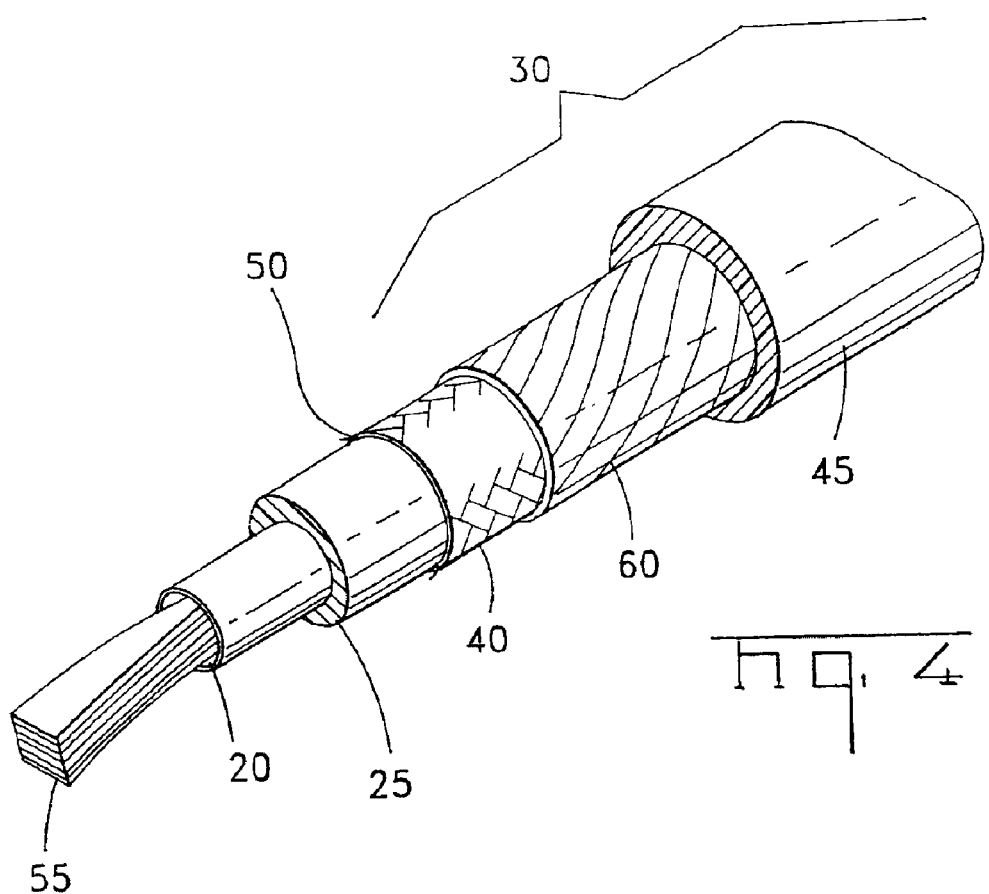
FIG. 4 is a perspective view of a communication cable according to another embodiment of the invention.

The principles of the invention apply to various optical cable designs, for example, optical communication assemblies and/or cables comprising at least one optical fiber, and composite assemblies and/or cables including at least one optical fiber and an electrical conductor.

In general, the communication cable and/or assemblies of the present invention may include the following basic elements: at least one optical waveguide, and at least one material. In one embodiment, the at least one material may be a blend of more than one thermoplastic polymer and the at least one material may include other suitable additives, however other suitable material(s) may be used, for example, thermoset elastomers and/or curable materials. The at least one optical waveguide is at least partially contacting and/or at least partially embedded within the at least one material. Other structures and components described herein may or may hot be incorporated into the communication assemblies and/or cables of the present invention. Such other structures and components, as described herein, are provided merely as part of possible embodiments of the invention and their description is in no way limiting of the invention.

The communication assemblies and/or cables of the present invention include at least one optical waveguide, for example, a single-mode, multi-mode or multi-core silica-based optical fiber. As depicted in FIG. 1, each optical fiber includes a core 5 and one or more coatings 10. It should be understood that herein the phrase "optical fiber" refers to the fiber itself and any coatings applied thereto.

At least partially surrounding the optical waveguide is a material(s) according to one embodiment of the present invention that comprises a three-dimensional polymeric network of molecules of a thermoplastic polymer that have bonded through crystallization, intermolecular hydrogen bonding and/or intermolecular polar attraction of functional groups and not necessarily through covalent crosslinking. As used herein, "a three-dimensional polymeric network of a thermoplastic polymer" means molecules of a thermoplastic polymer which are bonded at its ends to other thermoplastic polymer of like or unlike molecular units to form a soft but solid three-dimensional network of polymer connected through one or more of the above-mentioned bonds.

The three-dimensional network, optionally including various additives, desirably possesses suitable properties under severe conditions such that temperature change does not cause undesirable strain on the fibers, and desirably possesses a low modulus thereby minimizing the resulting strain on the optical fiber, and inhibits dripping at high temperatures.

The material(s) of the present invention provide an alternative to conventional, petroleum based filling materials. For example, the material(s) of the present invention desirably do not slump excessively at elevated service temperature, so that it will resist migrating out of the end of the tube. Further, the material(s) is desirably not excessively oily or greasy, and desirably has a soft rubber-like texture allowing for convenient handling during cable repair and other operations. Moreover, by use of the material(s), slicing of the tube may be employed for fiber access without ordinary dripping considerations.

Flooding and filling compounds are well-known in the art and should not be confused with the material(s) of the present invention. The filling compounds are found within the core or buffer tubes, whereas the flooding compounds are outside of the tubes. As a result of the differences in the proximity/contact of the filling compounds and the flooding compounds to the optical fiber, the materials generally differ. However, it is contemplated herein that suitable material(s) of the present invention may be useful as a flooding and/or filling compound.

Material(s) of the present invention that contact and/or have optical waveguides embedded therein include those that will allow the material(s) to have a Shore A hardness of about 75 or less, preferably about 50 or less, more preferably about 25 or less, even more preferably about 10 or less, even more preferably about 5 or less and even more preferably about 1 or less. However, material(s) of the present invention that are not intended to contact and/or have optical waveguides embedded therein may include a Shore A hardness that is greater than 75. In some embodiments, the three dimensional polymeric network of thermoplastic polymer is present in amounts from about 10% to about 100% by weight of the material(s).

Material(s) of the present invention may be relatively elastic and include those having a tensile modulus at 300% elongation in the range of about 1100 psi or less measured using ASTM method D-638.

In some embodiments, the final desired amount of thermoplastic polymer can depend partially on the kind of thermoplastic polymer selected and partially on the additives included. In any case, however, the amount of thermoplastic polymer must be sufficiently high that molecules of like or unlike polymer bond to form the three-dimensional network. In general, the present inventor believes that thermoplastic polymers having relatively high molecular weights form the three-dimensional network with relatively lower percentages of thermoplastic polymer. Likewise, the present inventor believes that thermoplastic polymers having relatively lower molecular weights form the three-dimensional network with relatively higher percentages of thermoplastic polymer.

The material(s) of the present invention differ substantially from conventional petroleum based material and a polymeric additive that do not embody a three-dimensional network. In such conventional filling materials, the ranges of additive amounts of polymeric material do not form a three-dimensional network. Further, the material(s) of the present invention desirably excludes fumed silica and other silica products often used with conventional petroleum based filling materials when the material(s) of the present invention are intended to contact non tight-buffered optical waveguides. However, superabsorbent materials such as hydrophilic polymers and other stabilizers often used with conventional petroleum based filling materials may be desirable.

Desirably, the material(s) according to the present invention containing the three-dimensional network of thermoplastic polymer melts and flows at temperatures above about 80° C., preferably about 90° C. to about 125° C. This may allow the polymer to be melted and introduced into a tube during cable manufacture. Further, the material(s) containing the three-dimensional network maintains its three-dimensional characteristics at as high as about 80° C. to inhibit dripping, and is sufficiently soft at as low as about −50° C. to avoid undue optical performance degradation.

Embodiments employing thermoplastic polymers in the material(s) of the present invention may include, but are not limited to, thermoplastic elastomers and rubbers that will form the three-dimensional network singly or in combination. Desirable thermoplastic elastomers include block copolymers having hard and soft polymeric units such as block copolymers of styrene and butadiene, block copolymers of styrene and isoprene, block copolymers of styrene and ethylene and/or butylene; and polyurethane elastomers and elastomeric alloys. Desirable thermoplastic rubbers include olefinic rubbers such as ethylene or propylene containing rubber, and other olefinic rubbers that can be plasticized sufficiently to achieve the desired softness. Other embodiments may include thermoset elastomers, such as, a multi-part thermoplastic elastomer.

In one embodiment, the thermoplastic polymer employed is a block copolymer. Such copolymers are available from Shell Chemicals under the tradename KRATON™ polymers and compounds. KRATON™ polymers are high performance thermoplastic elastomers. Other suitable block copolymers may available from, for example, Kuraray Co. Ltd. of Tokyo, Japan under the tradename SEPTON™.

Certain KRATON™ block copolymers are particularly suitable for use with the present invention due to an unusual combination of softness and low viscosity for easy thermoplastic processing at elevated temperatures or in solution.

The KRATON™ block copolymers are available as linear, diblock, triblock and radial polymers. Each molecule of KRATON™ block copolymer includes block segments of styrene monomer units and rubber monomer units. The most common structures are the linear A-B-A block types: styrene-butadiene-styrene (SBS) and styrene-isoprene-styrene (SIS).

The desired thermoplastic polymers of the present invention include rigid end blocks and a soft middle block. For example, the A-B-A structure of the KRATON™ block copolymers has polystyrene endblocks and an elastomeric midblock. Prior to processing, the polystyrene endblocks are associated in rigid domains. Physical bonding via these domains yields a continuous three-dimensional network. During processing, in the presence of heat and shear or solvent, the polystyrene domains disassociate and permit flow. After cooling or solvent evaporation, the polystyrene domains reform and harden, locking the three-dimensional network in place. The physical bonding and reinforcing effect of the styrene domains provide strength, and the rubber midblock provides elasticity.

Of special interest are the KRATON™ G polymers. A particularly preferred block copolymer of the KRATON™ G series is a second-generation polymer of the styrene-ethylene/butylene-styrene (SEBS) type. The polymers exhibit superior ozone resistance and can withstand prolonged outdoor exposure. Further, these polymers may be made, in accordance with the present invention with a sufficient softness such that they do not cause a undesirable strain on the optical fibers.

The thermoplastic material(s) or other material(s) of the present invention may include one or more additives to achieve superior appearance, performance and/or processing properties. These additives may include, but are not limited to plasticizers, lubricants, foaming agents, heat stabilizers, flame retardants, antioxidants, pigments, dyes and fillers. In certain embodiments, any one or more of the additives are excluded from the material(s) of the invention, yet in other embodiments, any one or more of the additives may be included.

Plasticizers are relatively nonvolatile liquids that are blended with polymers to alter their properties by intrusion between polymer chains. Plasticizers may be included within the material(s) to improve processing and exterior characteristics, reduce melt viscosity, reduce the minimum required processing temperature, improve flexibility and reduce hardness. A suitable plasticizer acts to plasticize the soft elastic sections of the copolymer molecules but leaves the three-dimensional network intact.

In some embodiments, the thermoplastic material(s) of the present invention do not require plasticizer. However, useful amounts of plasticizer may be employed. The amount of plasticizer employed may depend on the original softness, molecular weight and/or application of the thermoplastic material(s). The amount of plasticizer is about 10% or more based upon the total weight of the thermoplastic polymer or polymers employed, however the amount of plasticizer may be less than 10%. For example, where the thermoplastic material(s) are intended to contact non tight-buffered optical waveguides relatively higher amounts of plasticizer(s) may be used, depending on the molecular weight of the thermoplastic material(s), to inhibit undesirable strain on the optical waveguides.

Lubricants are materials which are incompatible with, for example, the thermoplastic polymer that are added to provide slip or release between the polymer and the buffer tube, optical fiber, or other polymer. Lubricants may also prevent the polymers from sticking to the metallic surfaces of the processing equipment. Lubricants, unlike plasticizers, may possess a certain degree of chemical incompatibility or insolubility which causes them to be exudated to the surface of the material(s) during processing and reducing the surface coefficient of friction. This surface modification results in easier processing, better extrusion and increased slip. Suitable lubricants may include, for example: low molecular weight polyethylene; oxidized polyethylene; low melt petroleum wax; mineral oil; vegetable oil; silicone oil; polyfluorocarbon powder; molybdenum disulfide; montanic acid; polyvinyl alcohol; various metallic stearates including calcium stearate and zinc stearate; steric acid; various hydrocarbons; fatty acids and alcohols, fatty acid esters such as glycerol monostearate, vegetable oils and carnauba wax; fatty amides such as oleamides, erucamides and bis-stearamides; and various polymers depending on the material(s) employed. Those skilled in the art will readily recognize suitable lubricants based upon their incompatibility with the material(s).

In some embodiments, the thermoplastic material(s) of the present invention do not require lubricant. However, useful amounts of the lubricant may be employed. The amount of lubricant is preferably less than about 5%, even more preferably less than about 3%, even more preferably less than about 2%, even more preferably less than 1% by weight of the thermoplastic polymer or polymers employed.

The material(s) of the present invention may be foamed by incorporating gas bubbles, foaming is generally not possible with conventional petroleum based filling or flooding compounds. Gas bubbles can be incorporated into the material(s) in a number of ways, such as, mechanical, chemical, or physical means. Nucleating agents can be used to create nucleation sites for the bubbles. In one embodiment, gas may be injected into the material(s) under pressure from an outside source via suitable nozzles or the like. Thereafter, during an appropriate mixing operation (generally under pressure) a substantially homogeneous distribution of very small, compressed gas bubbles throughout the material(s) occurs. During subsequent charging of this mixture into the interior of a tube, the material(s) is injected via appropriate funnels or the like. Subsequently, the gas bubbles expand to their final, still relatively small size because of the reduction in pressure the material(s) experiences when placed within the tube.

Another means of incorporating gas bubbles is by adding chemicals to the material(s), which generates a gas when heated. Given an appropriately thorough mixing, it is assured that the gas bubbles are uniformly distributed throughout the entire material(s) whereby the size of the gas bubbles is influenced or controlled by the pore size of the added material which generate the gas, by the temperature rise (or energy input) and by control of applied pressure. These chemical foaming agents (CFAs) are additives that produce a cellular structure in plastic products.

The CFAs can be added to the material(s) in different ways. They can be preblended with the material(s), blended using a hopper blender, metered in at the feed throat, or pumped in the case of liquids. The CFAs are dispersed into the material(s) as it is melted, then a decomposition reaction liberates a gas. There should be sufficient pressure to force the gas to dissolve into the melt. For proper cell formation, the gas must remain dissolved in the melt until its desired release. At that time, the gas expands out of solution and forms cells in the plastic. The plastic melt viscosity must be sufficient to maintain the cells, otherwise they will grow until they burst, resulting in collapsed or open celled foam.

Suitable CFAs may include azodicarbonamide, activated azodicarbonamide, modified azodicarbonamide, dinitrosopentamethylena tetramine, 4,4'-oxytals (benzenesulfonyl) hydrazine, 5-phenyltetrazole, p-toluenesulfonyl semicarbazinde, p-toluene sulfonyl hydrazide, 2,2'-azobisisobutyronitrile.

As an alternative or in addition to CFAs it may be expedient to add one or more fillers, for example, microspheres, particularly compressible microspheres, to the material(s). The microspheres can be composed of polyvinylidenechloride (for example, "EXPANCEL 551 DE" of the Expancel company). The use of hollow microspheres of polyacrylate may be desirable (for example, "EXPANCEL 091 DE" of the Expancel company).

For example, many thermoplastic polymers cannot be processed without the use of heat stabilizers since typical processing temperatures cause degradation of those polymers. Thus, it may be desirable to include one or more heat stabilizers in the material(s). The following classes of heat stabilizers may be useful in the material(s) of the present invention: barium-cadmium, organo-tin, calcium-zinc, lead, antimony mercaptides, epoxies and phosphites. Desirably, the amount of heat stabilizer is less than about 5%, even more preferably less than about 2%, even more preferably less than about 1% by weight based upon the total weight of the material(s) employed.

For many environments, for example, building riser applications, flame retardant compositions are necessary. Therefore, the material(s) may include one or more flame retardants. Suitable flame retardants may include antimony oxide, organic halogens, molybdenum compounds, alumina trihydrate, boron compounds organic phosphates, inorganic halides and/or other suitable flame retardants.

Antioxidants retard the rate of oxidation throughout the useful life of the polymer. The following classes of antioxidants may be useful in the material(s) of the present invention: hindered phenols, thiobisphenolics, aromatic amines, thioesters and phosphites. Desirably, the amount of antioxidant is less than about 5%, even more preferably less than about 2%, even more preferably less than about 1% by weight based upon the total weight of the material(s) employed.

Useful pigments include any substance, desirably in the form of a dry powder that imparts a desired color to the material(s). Desirable pigments may include organic pigments such as benzimidazolones (yellow, red, orange), phthalocyanimes (blue, green), quinacsidones (violet, red, orange), dioxanes (violet), isoindolinones (yellow, red, orange), disazos (yellow, red), pyrazalones (orange, red), diarylides (yellow, orange), dianisidines (orange); inorganic pigments such as titanium dioxide (white), lead chromates (yellow, orange), iron oxides (brown, red, maroon, yellow, black), chromium oxide (green), cadmium sulfoselenides (maroon, red, orange), lithopone (white), ultramarine blue (aluminosilicate complex with sulfur), nickel titanate (yellow), cobalt aluminate (blue), zinc chromate (yellow), lead molybdate (orange), cadmium sulfide (orange); lake pigments; pearlescent colorants; and daylight fluorescent colorants. Desirably, the amount of pigment is less than about 5%, even more preferably less than about 3%, even more preferably less than about 2%, even more preferably less than about 1% by weight of the material(s) employed.

Likewise, various dyes may be used to impart a desired color to the material(s). Suitable dyes may include azo dyes, diazodyes, pyrazolones, quinolones, quinophthalones, anthraquinones and nigrosines. Desirably, the amount of dye is less than about 5%, even more preferably less than about 3%, even more preferably less than about 2%, even more preferably less than about 1% by weight of the material(s) employed.

Fillers may be used in the present invention, however, their absence is preferred. The filler or fillers employed may desirably reduce costs without adversely affecting the physical properties of the material(s) or final cable.

The three-dimensional network of the material(s) of the present invention, with or without one or more of the above-described additives, allows for desirable connectorization, water blocking, suitable temperature performance and optical performance. The material(s) provides for clean removal because they are less oily/greasy. The material(s) provides excellent water resistance. The material (s) resists dripping at high temperatures, yet remain soft at low temperatures. The material(s) provides excellent resistance to undesirable attenuation changes. Moreover, the material(s) are economical because the base material(s) are inexpensive, additives such as silica are not necessary and expensive blending is often unnecessary.

In some embodiments, encasing the material(s) of the present invention and optical fibers is a conventional tube, for example, a buffer or core tube. The conventional tubes may be manufactured by methods and with materials known by those skilled in the art, for example, polypropylene, polyethylene, PBT and/or PVC. Conventional tubes generally have a hardness that is measured on the Shore D scale, which is harder than a Shore A scale, generally the range of 50 to 100. Likewise, the materials used for tight-buffering optical fibers are relatively hard and possess about the same hardness range as the materials used for conventional tubes. Selection of material(s) used will depend on the specific materials employed for the conventional tube. Generally, the material(s) of the present invention cannot possess properties which when in contact with the conventional tube deteriorate the tube.

The optical fiber and the material(s) may be inserted in the tube according to methods known by those skilled in the art. For example, the optical fibers may be advanced through a guide and a chamber, which resembles a tube and a die cavity in a conventional crosshead extruder. The space to be filled with the material(s) is substantially filled and then the tube is extruded thereover. Such processes are described in more detail in, for example, Gartside III et al, U.S. Pat. No. 4,826,278; Greveling, U.S. Pat. No. 4,763,982; Taylor et al, U.S. Pat. No. 4,776,910; and Arroyo, U.S. Pat. No. 4,730,894, the contents of each of which are incorporated by reference herein.

Alternatively, the optical fiber and the material(s) may be inserted within a premanufactured tube by longitudinally cutting the tube, separating the cut edges to form a gap, inserting the optical waveguides partially contacting and/or partially embedded within the material(s) into the tube through the gap and uniting the edges. Such processes are described in more detail in, for example, Portinari et al, U.S. Pat. No. 4,279,470, the contents of which are incorporated by reference herein.

FIGS. 2–3 are a perspective view and a cross-sectional view, respectively, of one of the embodiment of the present invention. As shown, there are three bundles 15 of optical fibers contacting and/or embedded within a material(s) 20 according to the present invention. While shown as three bundles of optical fibers, numerous other constructions are contemplated. For example, embedding a single or multiple optical fiber(s), an optical fiber ribbon(s), a ribbon stack, and/or bundle(s) of optical fibers partially contacting and/or partially embedded within the material(s) of the present invention are contemplated. Regardless of the construction, however, the optical waveguides are at least partially in contact with at least one material of the present invention. Further, it should be understood that the optical fibers may be undulated and/or stranded along portions of core tube 25 in a manner which causes each of the optical fibers to have a length which is greater than the length of core tube 25. This may prevent undesirable strain from being imparted to the optical fibers during manufacture, installation and service of the cable.

Surrounding the core tube 25 is a sheath system that is designated generally by the numeral 30. The sheath system may include one or more strength members 35, a tape 40 and an outer plastic jacket 45. Generally, the strength members 35 may be made of any of a number of conventionally used strength members. Likewise, the tape 40 may be made of any of a number of conventionally used tapes that prevent the adhesion of the jacket 45 to the core tube 25. The plastic jacket 45 may be made of any conventionally used material such as polyethylene. A ripcord 50 may be included to facilitate jacket removal.

Sheath systems according to the one described in FIGS. 2–3 are known in the art. The methods of manufacture and materials employed in making the sheath is described by, for example, Kinard et al., U.S. Pat. No. 4,844,575, the contents of which are hereby incorporated by reference herein.

Figure 5:
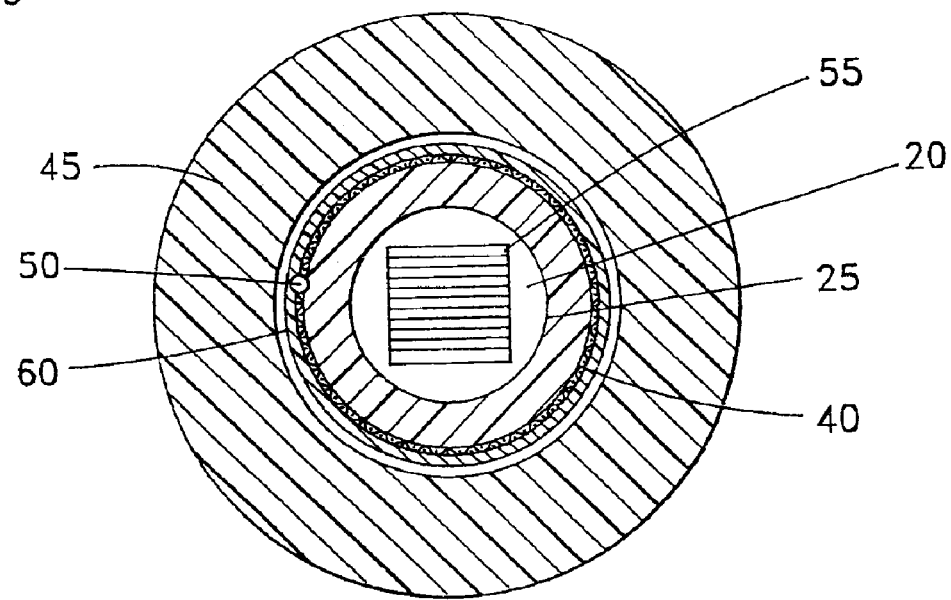
FIG. 5 is a cross-sectional view of a communication cable according to FIG. 4.

FIGS. 4–5 are a perspective view and a cross-sectional view, respectively, of another of the embodiments of the invention. As shown, there is a stack of optical fiber ribbons 55 embedded within a material(s) 20. The stack of optical fiber ribbons can be undulated and/or stranded along portions of the core tube 25 in a manner that causes each of the optical fibers to have a length that is greater than the length of core tube 25.

Surrounding the core tube 25 is a sheath system that is designated generally by the numeral 30. The sheath system may include a tape 40, one or more strength members 60 and an outer plastic jacket 45. Generally, the tape 40 and the plastic jacket 45 and ripcord 50 are similar to those described in the embodiment of FIGS. 2–3. The strength members 60, however, differ in that they are arranged in a helical wrapped fashion covering the outer area of the tube 25 and tape 40. Such strength members are well-known in the art and may be made of a diverse number of materials. See, for example, Arroyo et al., U.S. Pat. No. 4,818,060, the contents of which is hereby incorporated by reference herein.

Sheath systems according to the one described in FIGS. 4–5 are known in the art. The methods of manufacture and materials employed in making the sheath is described in, for example, Arroyo et al., U.S. Pat. No. 4,818,060, the contents of which are hereby incorporated by reference hereinabove.

Figure 6:
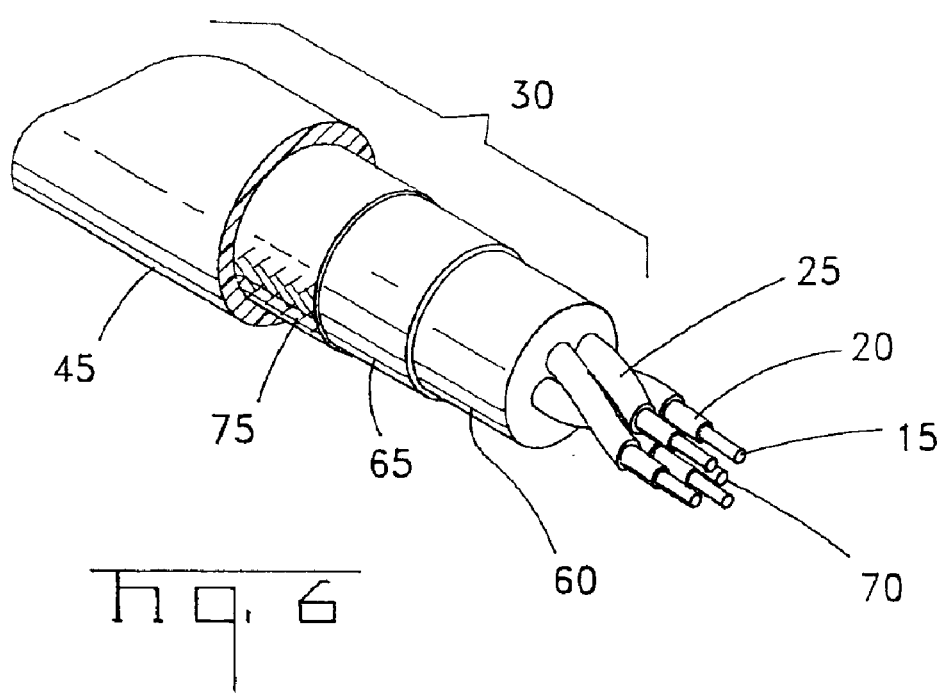
FIG. 6 is a perspective view of a communication cable according to yet another embodiment of the invention.
Figure 7:
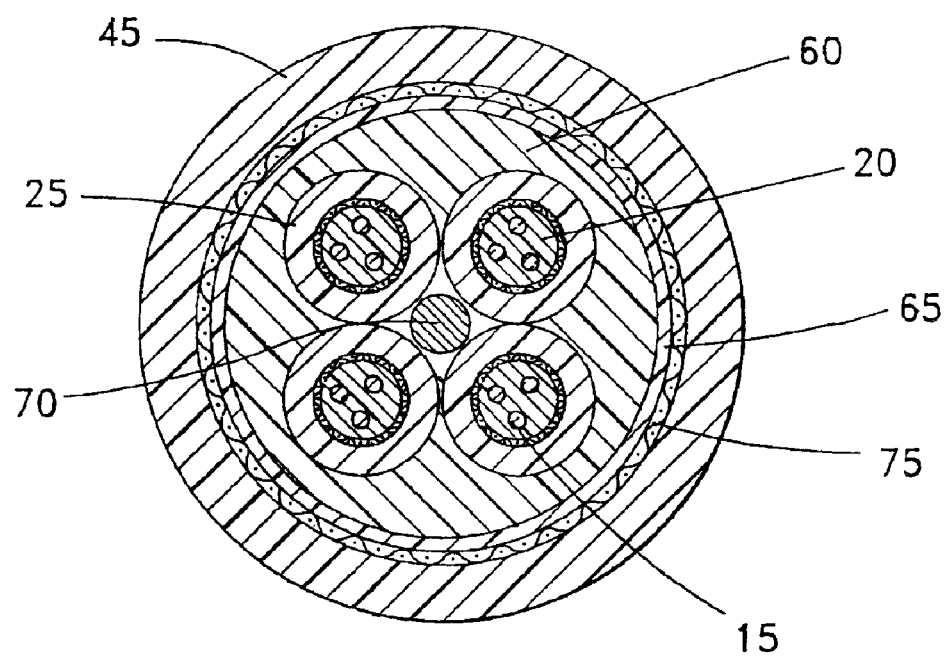
FIG. 7 is a cross-sectional view of a communication cable according to FIG. 6.

FIGS. 6–7 are a perspective view and a cross-sectional view, respectively, of yet another of the embodiments of the invention. As shown, there are four tubes 25 each containing three bundles 15 of optical fibers embedded within a material(s) 20. Each of the buffer tubes 25 is helically wrapped around a central strength member 70 which may be made of glass or aramid fiber yarn. As in FIGS. 2–3, numerous other constructions are contemplated. For example, a single optical fiber, a single bundle or multiple optical fibers separately dispersed in the material(s) are contemplated for each tube. Regardless of the construction, however, the material(s) 20 at least partially occupies the space between the optical fibers and tubes 25.

Surrounding tubes 25 is a sheath system that is designated generally by the numeral 30. The sheath system differs significantly from the above-described sheath systems in that it includes a flooding material 60. Surrounding the flooding material 60 is a core wrap 65, strength member yarn 75 and a jacket 45. The core wrap 65, strength member yarn 75 and jacket 45 may be made of conventionally used materials.

The flooding material 60 and the central strength member 70 occupy the space between the tubes 25 and the core wrap 65. Flooding compounds 60 are well-known in the art and should not be confused with the material(s) 20 of the present invention. Material(s) 20 of the present invention may be found within the tubes whereas the flooding compounds are outside of the tubes. As a result of the differences in the proximity/contact of the filling compounds and the flooding compounds to the optical fiber, the materials used for each generally differ. However, it is contemplated herein that certain filling materials will likewise be useful as a flooding compound and that suitable embodiments of the present invention may be use as either.

Sheath systems according to the one described in FIGS. 6–7 are known in the art. The methods of manufacture and materials employed in making the sheath is described in, for example, Arroyo et al. U.S. Pat. No. 4,818,060.

Figure 8:
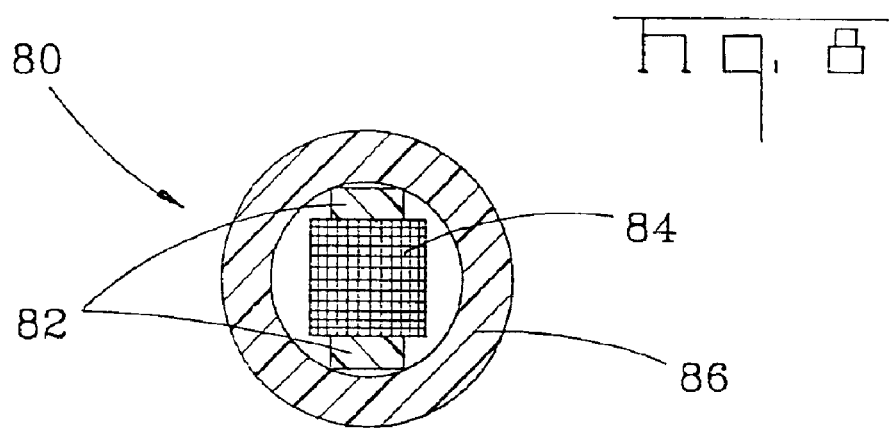
FIG. 8 is a cross-sectional view of a further embodiment of the present invention.

The material(s) of the present invention may have other suitable uses in optical cables. For example, as depicted in FIG. 8 at least one strip of material(s) 82 according to the present invention can be used as a frictional agent preventing the shifting of optical waveguide(s), for example, optical fiber ribbon stack 84, in a buffer tube 86 and/or increasing the force required to pull the optical waveguide(s) out of tube 86. Moreover, the strips of frictional agents may be continuous or intermittent, and may completely surround the optical waveguides.

Figure 9A:
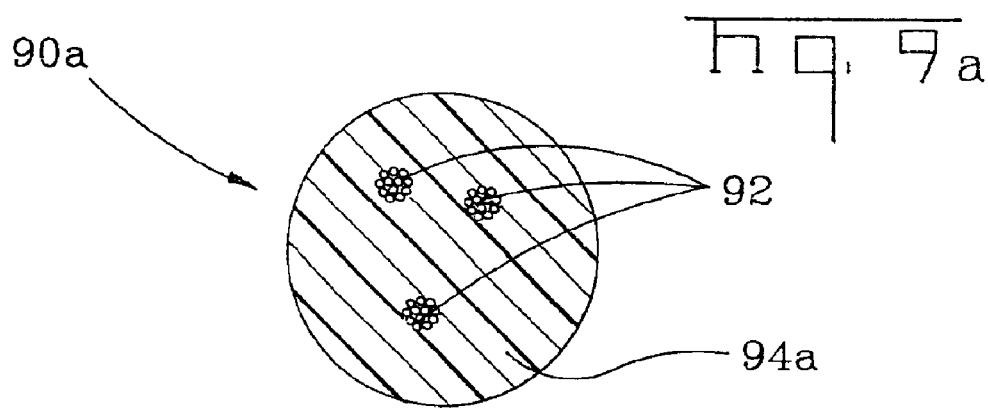
FIG. 9a is a cross-sectional view of another embodiment of the present invention.

FIG. 9a illustrates another explanatory embodiment depicting another use of the material(s) of the present invention in a communication cable. Specifically, embodiments of the present invention can exclude the conventional hard plastic buffer tubes, e.g., tubes 25 of FIGS. 6 and 7, that surround and protect the optical waveguides and material(s) of the present invention. Rather, in place of tubes 25 that house the material(s) and optical waveguides, an assembly 90a that includes a relatively soft housing 94a, made of material(s) of the present invention, suitable for contacting optical waveguide(s), in this case optical bundles 92, while water blocking optical waveguide(s) 92 at the same time.

In other words, optical waveguide(s) 92 are partially contacting and/or partially embedded within soft housing 94a forming a water blocking buffer region around optical waveguide(s) 92. In addition to water-blocking, suitable material(s) of the present invention house and protect the optical waveguide(s) 92 and should not be confused with filling materials that require conventional hard tubes to house and protect the optical fibers. Whereas conventional tubes have a hardness measured on the Shore D scale in the range of 50 or greater, the material(s) used for soft housing 94a generally have a Shore A hardness of about 75 or less, but may be harder depending on the proximity to the optical waveguides. Likewise, the present invention should not be confused with the relatively hard material used with conventional tight-buffered optical fibers. Moreover, soft housings of the present invention may be easily and cleanly removed from optical waveguides with the fingers allowing craftsman to work more efficiently than the tools required with conventional hard tubes or tight-buffered optical fibers. Optical waveguide(s) 92 may also include an interfacial layer thereon to promote stripability of housing, for example, a silicone-based lubricant or talc power.

Figure 9B:
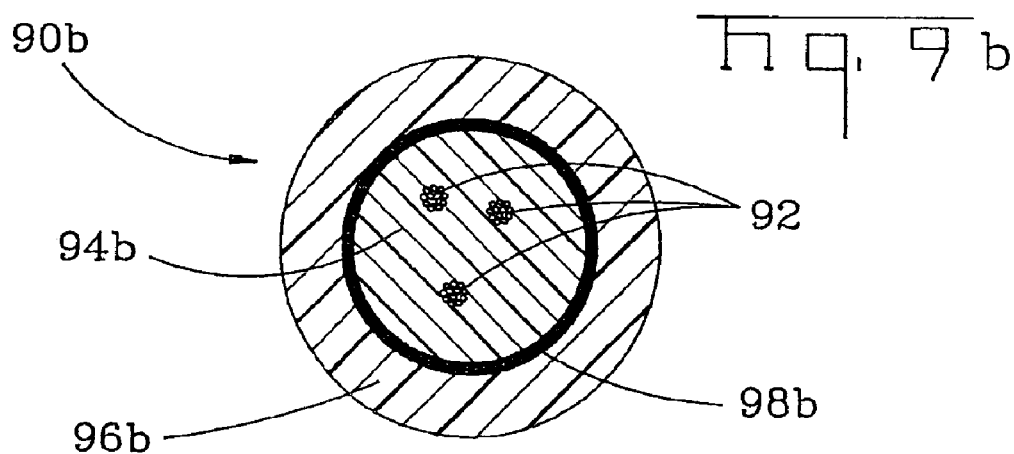
FIG. 9b is a cross-sectional view of another embodiment of the present invention.

As depicted in FIG. 9b, an assembly may be formed from one or more compositions of material(s) according to the present invention. Illustratively, a two component housing 90b may include a first material 94b and a second material 96b separated by an interfacial layer 98b. First material 94b is a core having optical waveguide(s) 92 disposed therein and second material 96b forms a cladding around first material 94b. First material 94b preferably is softer than second material 96b in order to inhibit optical attenuation, however, first material 94b may have the same or greater hardness than second material 96b. First material 94b has a tensile modulus at 300% elongation of generally about 500 psi or less measured using ASTM method D-638, but the tensile modulus may be greater. Second material 96b has a tensile modulus at 300% elongation of generally about 300 psi or more measured using ASTM method D-638, but the tensile modulus may be less.

For example, assembly 90b can include a MP-1845 monprene elastomer having a Shore OO hardness of about 30 and a tensile modulus at 300% elongation of about 30 psi measured using ASTM method D-638 as first material 94b and a MP-1500a monprene elastomer having a Shore A hardness of about 66 and a tensile modulus at 300% elongation of 600 psi measured using ASTM method D-638 as second material 96b, both materials being available from Teknor Apex of Pawtucket, R.I. However, second material 96b may have a Shore A hardness that is greater than 75. Interfacial layer 98b may be formed by additives, for example, lubricants or plasticizers that exude to the surface of first material 94b, however, other suitable interfacial layers may be employed to assist stripability between first and second materials, such as, a silicone-based lubricant or talc powder. Additionally, other suitable first and second materials may be used, for example, materials having additives as disclosed herein such as foaming additives, coloring additives, or other suitable additives.

Optical waveguide(s) 92 may be have different lay configurations, e.g., loose, bundled, or stranded and can be at least partially contacting and/or partially embedded within either the first material, the second material, or both. Assemblies 90a and/or 90b may then, for example, be stranded into a communication cable as depicted in FIGS. 6 and 7. Additionally, soft housings of the present invention may be used in other suitable communication cable designs. For example, using a conventional water blocking material with one or more materials of the present invention, housings having different colors for identification, and/or a plurality of housings disposed within a larger housing of thermoplastic material or other suitable materials.

Figure 10:
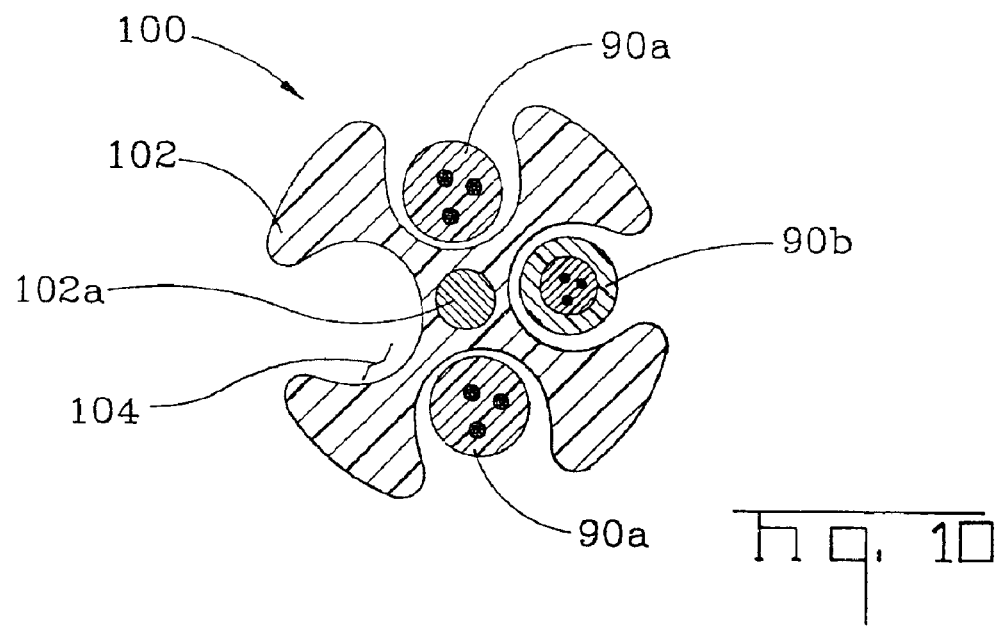
FIG. 10 is a cross-sectional view of another embodiment of the present invention.

Housings of the present invention, for instance, may be placed in a conventional tube, a slotted core, or other suitable components. FIG. 10 illustrates an exemplary assembly 100 for further protecting a plurality of housings such as 90a and/or 90b. Component 102 may be formed from a conventional hard thermoplastic material, a material according to the present invention, or a combination of both and may or may not have a central member 102a, for example, a steel wire embedded therein. Component 102 has a predetermined number of retention areas 104 allowing a predetermined number of housings 90a and/or 90b to be contained therein. Retention areas 104 are open to allow the craftsman to easily remove the housing from component 102 without tools, however retention areas 104 may by closed. Moreover, a predetermined number of optical waveguides may be organized into a predetermined number of housings, each housing having a predetermined number of optical waveguides allowing flexibility in routing. Additionally, the assembly may be part of a fiber optic cable further including a water-swellable substance, such as a tape 106 wrapped around component 102 or a yarn, a binder yarn (not shown), aramid fibers (not shown), and/or a jacket 108 providing further environmental protection (see FIG. 11).

Figure 11:
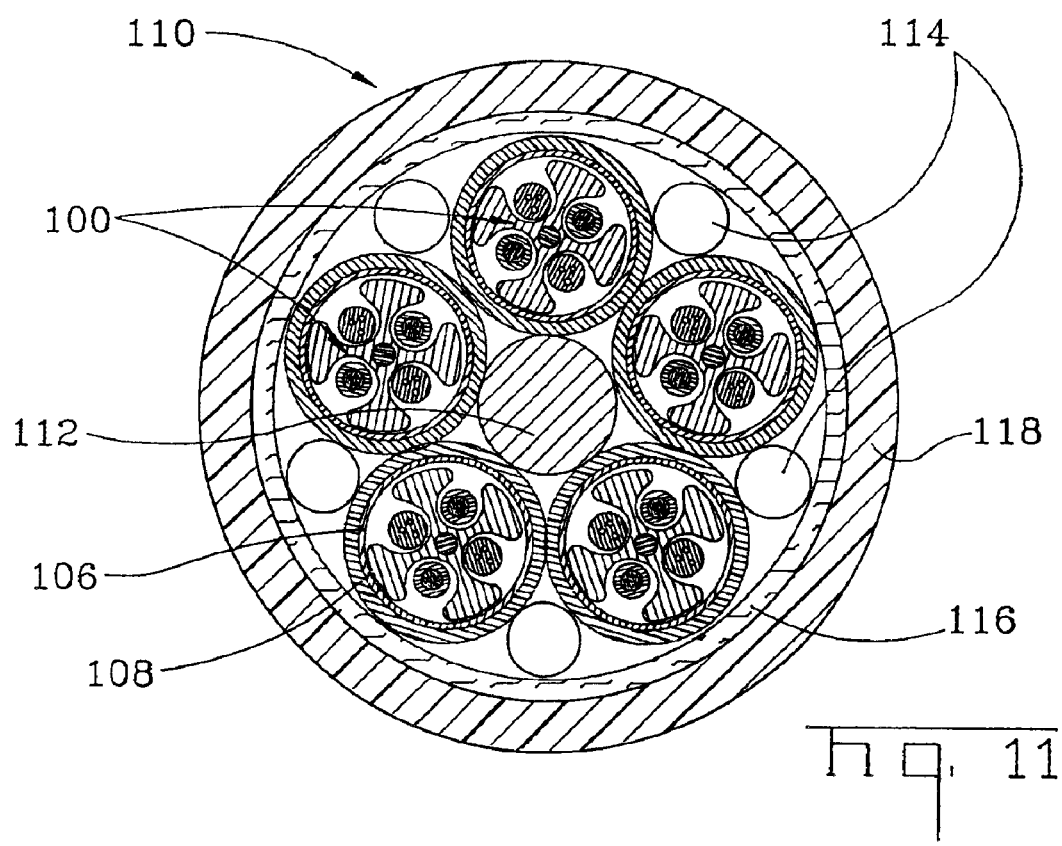
FIG. 11 is a cross-sectional view of another embodiment of the present invention.

FIG. 11 is an exemplary embodiment of a cable 110 constructed by stranding a plurality of assemblies 100 having jackets 108 around a central member 112, for example, a steel wire or GRP and a jacket 118 generally surrounding assemblies 100, however other suitable cable components may also be included such as binder threads (not shown), filler rods 114, other strength elements, for instance aramid yarns (not shown), and/or a water-blocking tape 116 or other suitable water-blocking materials, such as yarns. Dry cables of this exemplary design would be craft-friendly and allow substantial labor savings during, for example, splicing and/or access compared with cables having conventional buffer tubes.

The principals of the present invention may be practiced with other suitable materials. For example, a thermoset elastomer may be employed, such as, Sylgard® a two-part elastomer available from General Electric of New York. Other materials may include a curable material, such as, a UV or thermally curable material. The curable material may be cured in a gradient fashion to have a relatively low cross-linking near the optical waveguides and, for example, increasing the amount of cross-linking towards the surface, that is, being relatively soft where the optical waveguides are contacting and/or embedded therein and relatively harder near the outer surface. It is to be understood that the above-described embodiments are simply illustrative of the invention. Other materials may be devised by those skilled in the art that will embody the principles of the invention and fall within the spirit and scope thereof.

What is claimed is:

1. A fiber optic tube assembly, comprising:
   at least one optical fiber;
   a tube, wherein the at least one optical fiber is disposed with the tube; and
   at least one strip of material, the at least one strip of material being formed from a plurality of molecules that have bonded to form a three-dimensional network substantially throughout and acting as a frictional agent to increase the force required for pulling the at least optical fiber out of the tube, wherein said at least one strip of material has a Shore A hardness of about 75 or less.

2. The fiber optic tube assembly according to claim 1, the plurality of molecules are thermoplastic elastomers.

3. The fiber optic tube assembly according to claim 2, the thermoplastic elastomers are block copolymers.

4. The fiber optic tube assembly according to claim 3, the block copolymers are selected from the group of copolymers of styrene and butadiene, styrene and isoprene, styrene and ethylene, styrene and ethylene and butylene.

5. The fiber optic tube assembly according to claim 1, the at least one strip of material being at least one thermoplastic material comprising: (i) about 10% to about 100% by weight of thermoplastic polymeric molecules which have bonded to form a three-dimensional network substantially throughout the at least one thermoplastic material; and (ii) about 0% to about 90% of one or more additives that do not cause undesirable optical performance.

6. The fiber optic tube assembly according to claim 5, said at least one thermoplastic material comprises at least about 20% by weight of the thermoplastic polymeric molecules that have bonded to form the three-dimensional network.

7. The fiber optic tube assembly according to claim 5, the one or more additives is selected from the group of plasticizers, lubricants, foaming agents, heat stabilizers, flame retardants, antioxidant pigments, dyes, and fillers.

8. The fiber optic tube assembly according to claim 1, the at least one strip of material being a thermoplastic material possessing a melt flow temperature of about 80° C. or greater.

9. The fiber optic tube assembly according to claim 1, the at least one strip of material being a thermoplastic material having a tensile modulus at 300% elongation in the range of about 1100 psi or less measured using ASTM method D-638.

10. The fiber optic tube assembly according to claim 1, the at least one strip of material being continuous along the length of the tube.

11. The fiber optic tube assembly according to claim 10, the at least one strip of material being a thermoset elastomer.

12. The fiber optic tube assembly according to claim 1, the at least one optical fiber being a portion of an optical fiber ribbon.

13. The fiber optic tube assembly according to claim 1, the at least one optical fiber being a portion selected from the group consisting of bundled optical fibers and loose optical fibers.

14. The fiber optic tube assembly according to claim 1, the at least one strip of material being formed from a plurality of thermoplastic polymeric molecules that have bonded to form a three-dimensional network substantially throughout, wherein the thermoplastic polymeric molecules are thermoplastic rubbers.

15. The fiber optic tube assembly according to claim 1, fiber optic tube assembly being a portion of a cable.

16. A fiber optic tube assembly, comprising:
   at least one optical fiber;
   a tube, wherein the at least one optical fiber is disposed with the tube; and
   at least one strip of material, the at least one strip of material acting as a frictional agent to increase the force required for pulling the at least optical fiber out of the tube, wherein said at least one strip of material is at least one thermoplastic material comprising: (i) about 10% to about 100% by weight of thermoplastic polymeric molecules which have bonded to form a three-dimensional network substantially throughout the at least one thermoplastic material; and (ii) about 0% to about 90% of one or more additives that do not cause undesirable optical performance and the at least one thermoplastic material possesses a Shore A hardness of about 50 or less, a melt flow temperature over about 80° C.

17. The fiber optic tube assembly according to claim 16, the at least one strip of material being a thermoplastic material having a tensile modulus at 300% elongation in the range of about 1100 psi or less measured using ASTM method D-638.

18. The fiber optic tube assembly according to claim 16, the at least one strip of material being continuous along the length of the tube.

19. The fiber optic tube assembly according to claim 16, the at least one optical fiber being a portion of an optical fiber ribbon.

20. The fiber optic tube assembly according to claim 16, the fiber optic tube assembly being a portion of a cable.

21. A fiber optic tube assembly, comprising:
   at least one optical fiber;
   a tube, wherein the at least one optical fiber is disposed with the tube; and
   at least one strip of material, the at least one strip of material being formed from a plurality of molecules that have bonded to form a three-dimensional network substantially throughout and acting as a frictional agent for inhibiting the shifting of the optical fiber longitudinally along the tube.

22. The fiber optic tube assembly according to claim 21, the at least one strip of material being continuous along the length of the tube.

23. The fiber optic tube assembly according to claim 22, the at least one strip of material being a thermoset elastomer having molecules that have bonded to form a three-dimensional network.

24. The fiber optic tube assembly according to claim 21, the fiber optic tube assembly being a portion of a cable.

* * * * *